US012788542B2

(12) United States Patent
Kyon et al.

(10) Patent No.: US 12,788,542 B2
(45) Date of Patent: Nov. 10, 2026

(54) DENTAL PROSTHESIS PROCESSING DEVICE AND METHOD OF MANAGING PROCESSING TOOL OF THE SAME

(71) Applicant: Huvitz Co., Ltd., Anyang-si (KR)

(72) Inventors: Byung Woo Kyon, Anyang-si (KR); Young Gil Shim, Anyang-si (KR); Yong Han Kim, Anyang-si (KR); Weon Joon Lee, Anyang-si (KR)

(73) Assignee: HUVITZ CO., LTD., Anyang-si (KR)

( * ) Notice: Subject to any disclaimer, the term of this patent is extended or adjusted under 35 U.S.C. 154(b) by 390 days.

(21) Appl. No.: 18/526,003

(22) Filed: Dec. 1, 2023

(65) Prior Publication Data

US 2024/0189077 A1 Jun. 13, 2024

(30) Foreign Application Priority Data

Dec. 7, 2022 (KR) ........................ 10-2022-0169471

(51) Int. Cl.
*A61C 13/00* (2006.01)

(52) U.S. Cl.
CPC ...... *A61C 13/0004* (2013.01); *A61C 13/0006* (2013.01)

(58) Field of Classification Search
CPC ............ A61C 13/0004; A61C 13/0006; A61C 13/0022; A61C 1/0007; A61C 3/02;
(Continued)

(56) References Cited

U.S. PATENT DOCUMENTS 4,249,243 A * 2/1981 Yoshida ............. B23Q 3/15539 318/569
2002/0137002 A1* 9/2002 Bodenmiller ...... A61C 13/0004 433/51

(Continued)

FOREIGN PATENT DOCUMENTS

| | | | |
|---|---|---|---|
| JP | 1999-239940 | A | 9/1999 |
| KR | 10-1931776 | B | 12/2018 |
| KR | 10-2022-0092865 | A | 7/2022 |

OTHER PUBLICATIONS

European search report for European counterpart application No. 23212080.8 dated May 15, 2024.

(Continued)

*Primary Examiner* — Alicia M. Choi
(74) *Attorney, Agent, or Firm* — United One Law Group LLC; Kongsik Kim; Jhongwoo Peck

(57) ABSTRACT

A dental prosthesis processing device that processes a workpiece made of ceramic or the like into a prosthesis of a desired shape includes one or more processing tools for processing a workpiece into a prosthesis of a predetermined shape; a spindle on which the processing tools are replaceably mounted and that is spatially movable in position; a processing tool replacement obstruction part located in close proximity to the processing tools and/or the spindle and configured to obstruct the processing tools from being replaced; and a controller configured to determine whether to replace the processing tools. Depending on whether the replacement is necessary or not, the controller allows or prevents the processing tools from being replaced by bringing the processing tools and/or the spindle and the processing tool replacement obstruction part away from or close to each other.

7 Claims, 6 Drawing Sheets

(58) Field of Classification Search
CPC ........................ B23Q 3/15533; B23Q 17/0995; B23Q 3/155; B23Q 3/15706; B23Q 3/1554; G05B 2219/37252; G05B 2219/50239; G05B 19/4065; G05B 2219/45167; G05B 2219/45172
See application file for complete search history.

(56) References Cited

U.S. PATENT DOCUMENTS

| | | | | |
|---|---|---|---|---|
| 2004/0229555 | A1* | 11/2004 | Hutchins ............... | B24B 23/022 451/357 |
| 2010/0184574 | A1* | 7/2010 | Shark ................. | B23Q 3/15533 483/1 |
| 2021/0161618 | A1* | 6/2021 | Sarig ........................ | A61C 1/14 |
| 2022/0378560 | A1 | 12/2022 | Schneider et al. | |
| 2024/0207023 | A1* | 6/2024 | Ito ...................... | A61C 13/0006 |

OTHER PUBLICATIONS

Office action for Korean counterpart application No. 10-2022-0169471 dated Dec. 19, 2024.

* cited by examiner

DENTAL PROSTHESIS PROCESSING DEVICE AND METHOD OF MANAGING PROCESSING TOOL OF THE SAME

CROSS-REFERENCE TO RELATED APPLICATION

This application claims priority from Korean Application No. 10-2022-0169471 filed Dec. 7, 2022, which is incorporated herein by reference in its entirety.

TECHNICAL FIELD

The present disclosure relates to a dental prosthesis processing device, and more particularly, to a dental prosthesis processing device that processes a workpiece made of ceramic or the like into a prosthesis of a desired shape, and a method of managing a processing tool used therein.

RELATED ART

A dental prosthesis processing device is a device that rotates a processing tool at high speed, grinds a hard workpiece, and processes it into a prosthesis of a desired shape. Processing tools used in dental prosthesis processing devices include burs, drills, and the like.

FIG. 1 is a diagram for describing the structure and operation of a dental drill device as a typical dental prosthesis processing device. As shown in FIG. 1, a typical dental drill device includes one or more processing tools 40 for processing a workpiece 1, a spindle 20 on which the processing tools 40 are rotatably mounted, and a workpiece fixing part 10 on which the workpiece 1 is mounted.

In the dental prosthesis processing device, the processing tools 40 continuously wear out according to the processing of the workpiece 1 and must be replaced when its service life is over. The service life of the processing tools 40 used in the dental prosthesis processing device is determined according to the material of the workpiece 1, the desired shape of the prosthesis, and the like. In general, the processing tools 40 have a short service life, a short replacement cycle, and are expensive. In order to safely and accurately process the workpiece 1 without any damage, the processing tools 40 must be continuously taken care of.

The processing tool 40 whose service life is over is replaced manually or automatically (electric tool exchange). In the case of an electric tool exchange device in which the processing tool 40 is replaced automatically, since a large number of complex electric devices and control devices are needed to replace the processing tool 40, the device gets complicated and the manufacturing cost of the processing device increases significantly.

On the other hand, in the case that the user manually replaces the processing tool 40, the user checks the service life of the processing tool 40 by him/herself and replaces the processing tool 40 when the service life of the processing tool 40 is over. That is, for each processing tool 40, the user records the number of uses, usage time, and the like of the processing tool 40, checks the service life of the processing tool 40, removes the processing tool 40 whose service life is over from the spindle 20 when the service life of the processing tool 40 is over, and mounts a new processing tool 40 on the spindle 20. Not only is managing the service life of such processing tools 40 cumbersome, but there may also arise a case where the user replaces processing tools 40 whose service life is not over by mistake.

SUMMARY

It is an object of the present disclosure to provide a dental prosthesis processing device and a method of managing processing tools thereof that can reduce user errors that may occur when replacing the processing tools by allowing only processing tools whose service life is over to be replaced.

It is another object of the present disclosure to provide a dental prosthesis processing device and a method of managing processing tools thereof in which the service life of the processing tools is checked in the dental prosthesis processing device and that allow a processing tool whose service life is over to be replaced only when the service life of the processing tool is over.

In order to achieve the above objects, the present disclosure provides a dental prosthesis processing device comprising: one or more processing tools 40 for processing a workpiece 1 into a prosthesis of a predetermined shape; a spindle 20 on which the processing tools 40 are replaceably mounted and that is spatially movable in position; a processing tool replacement obstruction part 30 located in close proximity to the processing tools 40 and/or the spindle 20 and configured to obstruct the processing tools 40 from being replaced; and a controller 50 configured to determine whether to replace the processing tools 40, wherein the controller 50 brings the processing tools 40 and/or the spindle 20 and the processing tool replacement obstruction part 30 close to each other, thereby preventing the processing tools 40 from being replaced if replacement of the processing tools 40 is not necessary, and the controller 50 moves the processing tools 40 and/or the spindle 20 and the processing tool replacement obstruction part 30 away from each other, thereby allowing a user to replace the processing tools 40 if the replacement of the processing tools 40 is necessary.

The present disclosure also provides a method of managing processing tools of the dental prosthesis processing device, the method comprising: determining by the controller 50 whether to replace the processing tools 40; and preventing the processing tools 40 from being replaced by bringing the processing tools 40 and/or the spindle 20 and the processing tool replacement obstruction part 30 close to each other by the controller 50 if replacement of the processing tools 40 is not necessary in the determining, and allowing a user to replace the processing tools 40 by moving the processing tools 40 and/or the spindle 20 and the processing tool replacement obstruction part 30 away from each other by the controller 50 if the replacement of the processing tools 40 is necessary in the determining.

The dental prosthesis processing device and the method of managing processing tools thereof in accordance with the present disclosure can reduce user errors that may occur when replacing the processing tools by allowing only processing tools whose service life is over to be replaced. In addition, according to the present disclosure, the service life of the processing tools is checked in the dental prosthesis processing device and a processing tool whose service life is over is allowed to be replaced only when the service life of the processing tool is over.

DETAILED DESCRIPTION

Figure 1:
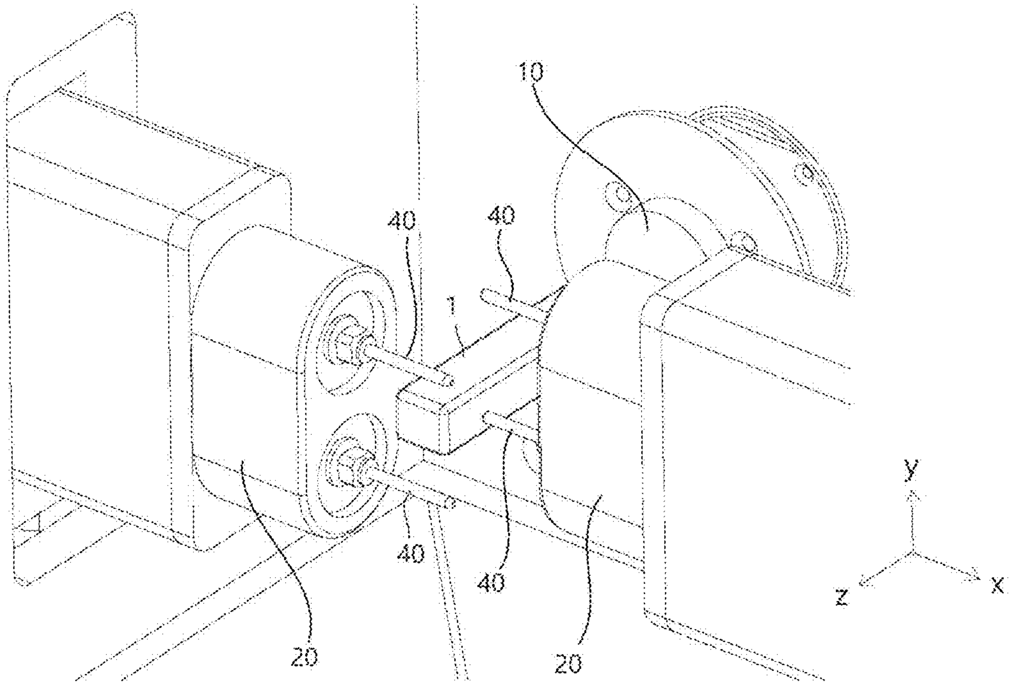
FIG. 1 is a diagram for describing the structure and operation of a typical dental prosthesis processing device.

Hereinafter, the present disclosure will be described in detail with reference to the accompanying drawings. In the accompanying drawings, elements that perform the same or similar functions as those in the prior art are given the same reference numerals. In addition, specific descriptions of known general functions or configurations will be omitted in the description of the present disclosure.

Figure 2:
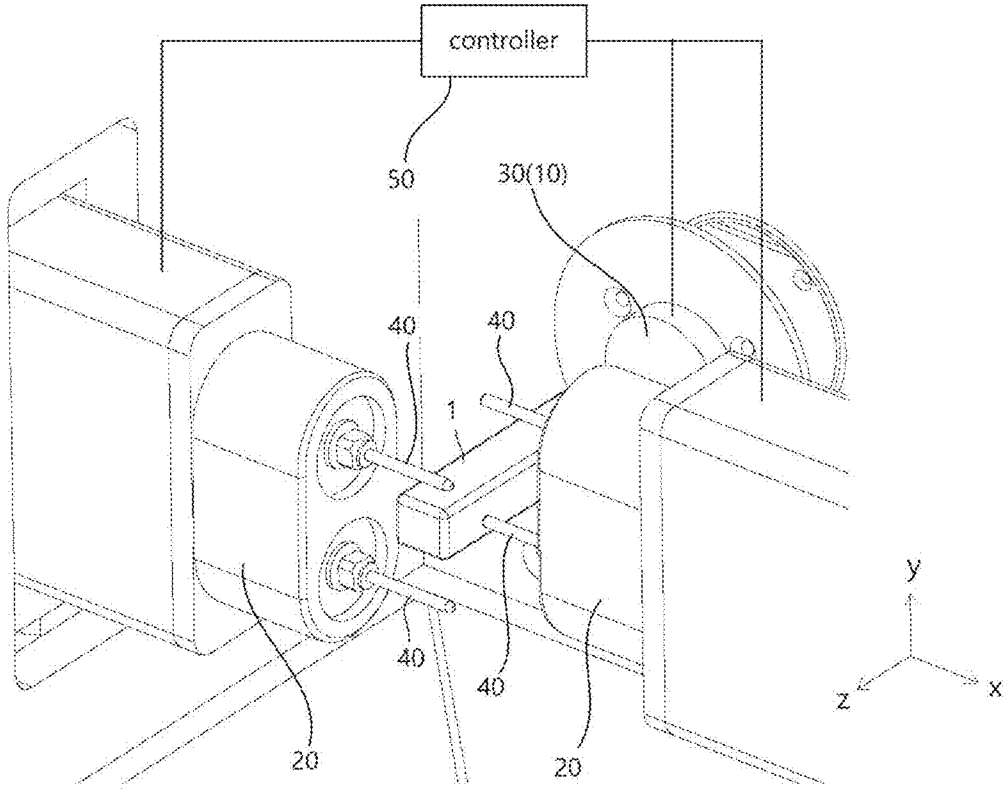
FIG. 2 is a diagram for describing the configuration of a dental prosthesis processing device in accordance with one embodiment of the present disclosure.

FIG. 2 is a diagram for describing the configuration of a dental prosthesis processing device in accordance with one embodiment of the present disclosure. As shown in FIG. 2, the dental prosthesis processing device in accordance with one embodiment of the present disclosure includes one or more processing tools 40, a spindle 20 on which the processing tools 40 are detachably mounted and that is spatially movable in position, a processing tool replacement obstruction part 30, and a controller 50.

The processing tools 40 are typical processing devices for processing a workpiece 1 into a prosthesis of a predetermined shape, and may be, for example, burs, drills, or the like for grinding the workpiece 1. The spindle 20 is mounted so that the processing tools 40 can be replaced, spatially moves in position while rotating the processing tools 40, and processes the workpiece 1 into a prosthesis of a predetermined shape. That is, when the spindle 20 moves according to the shape data of the desired prosthesis, the processing tools 40 mounted on the spindle 20 also move identically, the workpiece 1 is processed, e.g., ground, by the distance moved by the rotating processing tools 40, and a prosthesis of the desired shape is obtained. The rotation of the processing tools 40 and the movement of the spindle 20 may be performed by the controller 50 of the dental prosthesis processing device. One or more processing tools 40, for example, four, two on each side of the workpiece 1, may be disposed, as shown in FIG. 2. In this case, the two processing tools 40 on the left may process the workpiece 1 while moving in the +x, +y, and −y directions, and the two processing tools 40 on the right may process the workpiece 1 while moving in the −x, +y, and −y directions. One of the two processing tools 40 on both sides may be used for crude processing of the workpiece 1, and the other may be used for fine processing of the workpiece 1. The workpiece 1 may be mounted on the workpiece fixing part 10 and processed while moving in the +z and −z directions.

The processing tool replacement obstruction part 30 is located in close proximity to the processing tools 40 and/or the spindle 20, and serves to obstruct the processing tools 40 from being replaced. Specifically, the processing tool replacement obstruction part 30 is located in close proximity to the front or side of the processing tools 40 and/or the spindle 20, and serves to obstruct the processing tools 40 from being removed from the spindle 20 by blocking the path along which the processing tools 40 are separated from the spindle 20 or obstructing the entry of a tool (e.g., a socket wrench, etc.) for separating the processing tools 40 from the spindle 20.

The processing tool replacement obstruction part 30 may be mounted as a separate element, or the conventional workpiece fixing part 10 on which the workpiece 1 is mounted may be used as the processing tool replacement obstruction part 30. That is, as shown in FIG. 2 and FIGS. 3 to 6 to be described later, the workpiece fixing part 10 may approach or move away from the processing tools 40 and/or the spindle 20 while moving in the +z and −z directions, and perform the role of the processing tool replacement obstruction part 30.

The controller 50 determines whether to replace the processing tools 40 based on predetermined decision criteria. For example, the controller 50 calculates the service life of the processing tools 40 and determines whether to replace the processing tools 40. Here, if the replacement of the processing tools 40 is not necessary (e.g., if the service life of the processing tools 40 is not over yet), the controller 50 prevents the processing tools 40 from being replaced by bringing the processing tools 40 and/or the spindle 20 and the processing tool replacement obstruction part 30 close to each other. On the other hand, if the replacement of the processing tools 40 is necessary (e.g., if the service life of the processing tools 40 is over), the controller 50 moves the processing tools 40 and/or the spindle 20 and the processing tool replacement obstruction part 30 away from each other and allows the user to replace the processing tools 40. The approach and move-away of the processing tools 40 and/or the spindle 20 to and from the processing tool replacement obstruction part 30 may be performed by moving the processing tools 40 and the spindle 20, moving the processing tool replacement obstruction part 30, or moving both the processing tools 40 and the spindle 20 and the processing tool replacement obstruction part 30.

In the controller 50, the calculation of the service life of the processing tools 40, i.e., the determination of whether to replace the processing tools 40, may be calculated based on one or more of the number of uses of the processing tools 40, the types of the processing tools 40, the material of the workpiece 1 processed by the processing tools 40, and the like, and may be calculated by further taking into account the rotation speed of the processing tools 40, the usage time, the material or shape of the workpiece 1 to be processed next, and the like as necessary. For example, the number of uses of the processing tools 40 is 10 to 15, and it may be determined to replace the processing tools 40 if this number of uses is exceeded. On the other hand, if the material of the workpiece 1 to be processed next is very hard or the shape is complex, the controller 50 may determine to replace the corresponding processing tools 40 even if the processing tools 40 have a service life remaining when the corresponding information is inputted to the controller 50. When the processing tools 40 are replaced in such a process, information on the new processing tools 40 that have been replaced is stored in the memory of the controller 50, and the replacement time of the new processing tools 40 can be calculated based thereon.

In one embodiment of the present disclosure, if the processing tools 40 need to be replaced according to the decision of the controller 50, the controller 50 moves the processing tools 40 and/or the spindle 20 away from the processing tool replacement obstruction part 30, and sends out a replacement alarm signal to the user if necessary, so as to allow the user to replace the processing tools 40. For example, the controller 50 controls the positions of the processing tools 40 and/or the spindle 20 and the processing tool replacement obstruction part 30 so that only the processing tool 40 that needs to be replaced can be replaced. According to the present disclosure, the user cannot arbitrarily replace the processing tools 40 without the replacement decision by the controller 50, and can replace the processing tools 40 only when there is a replacement decision by the controller 50.

Figure 3:
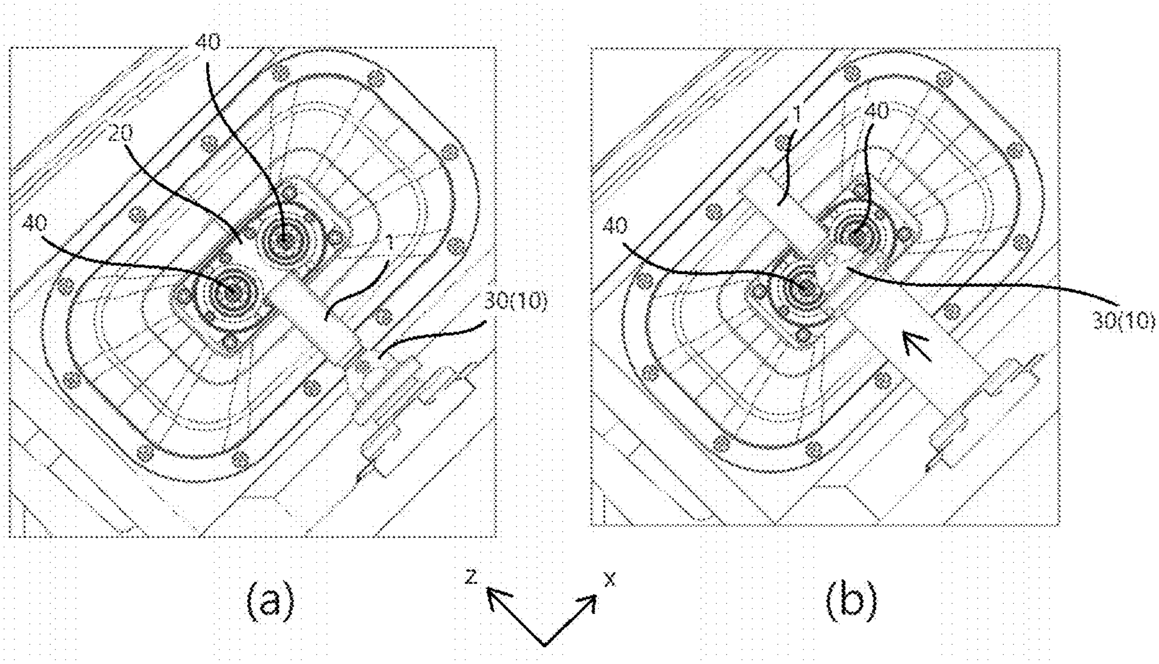
FIGS. 3 and 4 are a side view and a front view showing the positional relationship between processing tools and a processing tool replacement obstruction part, in a dental prosthesis processing device in accordance with one embodiment of the present disclosure.
Figure 4:
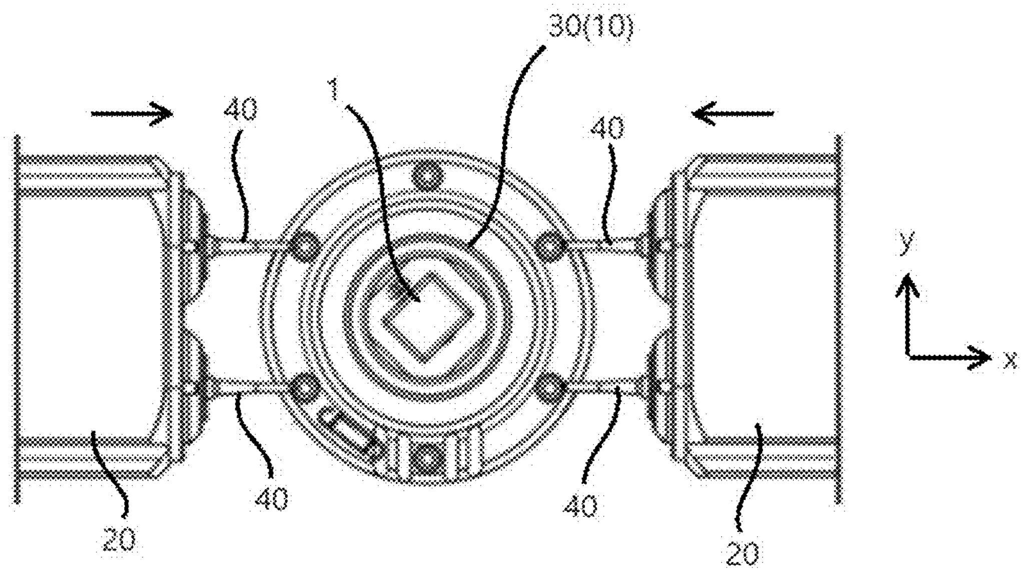

FIGS. 3 and 4 are a side view and a front view showing the positional relationship between processing tools 40 and a processing tool replacement obstruction part 30, in a dental prosthesis processing device in accordance with one embodiment of the present disclosure. In the example shown in FIGS. 3 and 4, the dental prosthesis processing device includes four processing tools 40 mounted on two spindles 20 and a processing tool replacement obstruction part 30. Here, the workpiece fixing part 10 on which the workpiece 1 is mounted is used as the processing tool replacement obstruction part 30. The processing tool replacement obstruction part 30 may be a workpiece fixing socket that fixes the workpiece 1. The workpiece fixing part 10 is movable in the z-axis direction.

If the controller 50 of the dental prosthesis processing device allows the replacement of the processing tools 40, the processing tool replacement obstruction part 30 is moved away from the processing tools 40 and allows the user to replace the processing tools 40 (sec (a) of FIG. 3). On the other hand, if the controller 50 of the dental prosthesis processing device does not allow the replacement of the processing tools 40, the processing tool replacement obstruction part 30 approaches the processing tools 40 and prevents the user from replacing the processing tools 40 (sec (b) of FIG. 3). At this time, the processing tool replacement obstruction part 30 may move in the z direction, and the spindles 20 and the processing tools 40 on both sides may move in the x direction and/or the y direction, thereby bringing the processing tool replacement obstruction part 30 and the processing tools 40 close to each other (see FIGS. 3 and 4). The workpiece fixing part 10 acts as an obstacle, making it impossible to replace the processing tools 40.

A method of managing processing tools of a dental prosthesis processing device in accordance with the present disclosure includes determining whether to replace the processing tools 40 by the controller 50 in the dental prosthesis processing device; and preventing the processing tools 40 from being replaced by bringing the processing tools 40 and/or the spindle 20 and the processing tool replacement obstruction part 30 close to each other by the controller 50 if the replacement of the processing tools 40 is not necessary in the determining, and allowing the user to replace the processing tools 40 by moving the processing tools 40 and/or the spindle 20 and the processing tool replacement obstruction part 30 away from each other by the controller 50 if the replacement of the processing tools 40 is necessary in the determining. The method of managing processing tools of a dental prosthesis processing device in accordance with the present disclosure may be applied when the processing tools 40 are not processing the workpiece 1.

According to another aspect of the present disclosure, by adjusting the position of the spindle 20 including the processing tools 40 and/or the processing tool replacement obstruction part 30, only the processing tools 40 that need to be replaced may be positioned where they can be replaced, and the processing tools 40 that do not need to be replace may be placed where they cannot be replaced. In this case, only the processing tools 40 that need to be replaced can be selectively replaced.

Figure 5:
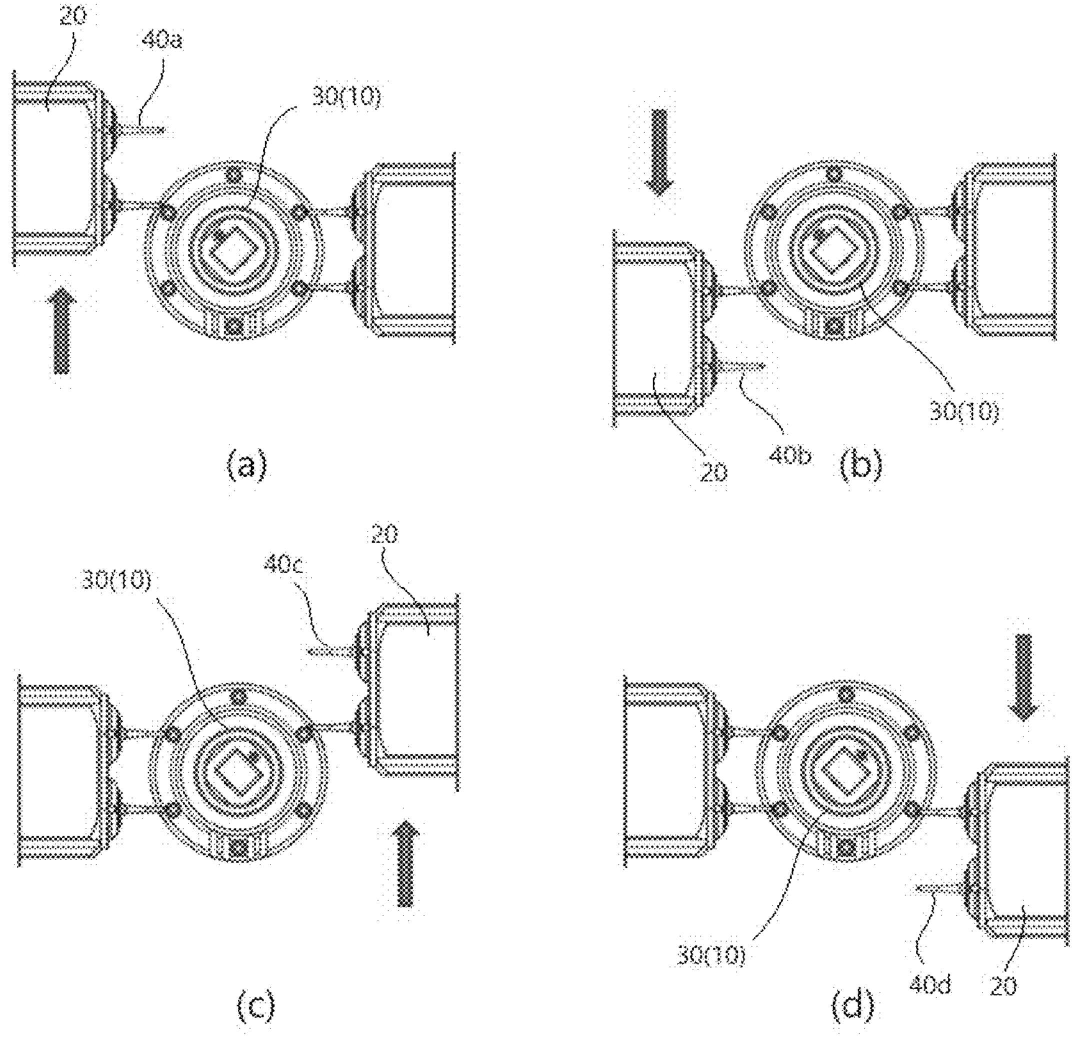
FIG. 5 is a diagram showing a state of moving only the processing tool that needs to be replaced out of a number of processing tools to a replaceable position, according to another aspect of the present disclosure.

FIG. 5 is a diagram showing a state of moving only the processing tool 40 that needs to be replaced out of a number of processing tools 40 to a replaceable position, according to another aspect of the present disclosure. As shown in FIG. 5, the processing tools 40 include first to fourth processing tools 40*a*, 40*b*, 40*c*, and 40*d*, and the positions of the spindles 20 and the workpiece fixing part 10 are adjusted in order to replace the respective processing tools 40*a*, 40*b*, 40*c*, and 40*d*.

As described above, if the controller 50 of the dental prosthesis processing device does not allow the replacement of the processing tools 40, the processing tool replacement obstruction part 30 may move in the z direction and the spindles 20 and the processing tools 40 on both sides may move in the x direction and/or the y direction, thereby bringing the processing tool replacement obstruction part 30 and the processing tools 40 close to each other (sec (b) of FIG. 3 and FIG. 4) and yielding a state where the processing tools 40 cannot be replaced.

At this time, if the replacement of the first processing tool 40*a* is necessary, the controller 50 can move the first processing tool 40*a* to a replaceable position by moving the spindle 20 on which the first processing tool 40*a* is mounted in the +y direction (the direction of the arrow in (a) of FIG. 5) and thereby moving the first processing tool 40*a* and the workpiece fixing part 10 away from each other, as shown in (a) of FIG. 5. In this state, the first processing tool 40*a* is replaceable as it is present at a position spaced away from the workpiece fixing part 10, but the remaining second, third, and fourth processing tools 40*b*, 40*c*, and 40*d* are positioned in close proximity to the workpiece fixing part 10 and cannot be replaced as the workpiece fixing part 10 serves as an obstacle. At this time, the controller 50 may send a replacement notification signal for the first processing tool 40*a* to the user if necessary. In this way, when the first processing tool 40*a* moves to the replaceable position, the user replaces the first processing tool 40*a*.

Next, (b) of FIG. 5 shows a state of replacing the second processing tool 40*b*. If the controller 50 has determined that replacement of the second processing tool 40*b* is necessary, the spindle 20 on which the second processing tool 40*b* is mounted is moved in the −y direction (the direction of the arrow in (b) of FIG. 5), thereby moving the second processing tool 40*b* and the workpiece fixing part 10 away from each other, and thus, the second processing tool 40*b* can be replaced. At this time, since the remaining first, third, and fourth processing tools 40*a*, 40*c*, and 40*d* except for the second processing tool 40*b* are in a state (structure) in which they cannot be replaced as they are located in close proximity to the workpiece fixing part 10, only the second processing tool 40*b* can be replaced.

Next, (c) of FIG. 5 shows a state of replacing the third processing tool 40*c*. If the controller 50 has determined that replacement of the third processing tool 40*c* is necessary, the spindle 20 on which the third processing tool 40*c* is mounted is moved in the +y direction (the direction of the arrow in (c) of FIG. 5), thereby moving the third processing tool 40*c* and the workpiece fixing part 10 away from each other, and thus, the third processing tool 40*c* can be replaced. At this time, since the remaining first, second, and fourth processing tools 40*a*, 40*b*, and 40*d* except for the third processing tool 40*c* are in a state (structure) in which they cannot be replaced as they are located in close proximity to the workpiece fixing part 10, only the third processing tool 40*c* can be replaced.

Next, (d) of FIG. 5 shows a state replacing the fourth processing tool 40*d*. If the controller 50 has determined that replacement of the fourth processing tool 40*d* is necessary, the spindle 20 on which the fourth processing tool 40*d* is mounted is moved in the −y direction (the direction of the arrow in (d) of FIG. 5), thereby moving the fourth processing tool 40*d* and the workpiece fixing part 10 away from each other, and thus, the fourth processing tool 40*d* can be replaced.

In the present disclosure, the controller 50 can control the positions of the workpiece fixing part 10 and the spindles 20 according to the processing tools 40*a*, 40*b*, 40*c*, and 40*d* to be replaced. At this time, the remaining processing tools except for the processing tool to be replaced are located in close proximity to the workpiece fixing part 10 and turn into a state in which they cannot be replaced. In the present disclosure, the workpiece fixing part 10 can be used as the processing tool replacement obstruction part 30 regardless of whether the workpiece 1 is mounted or not.

Figure 6:
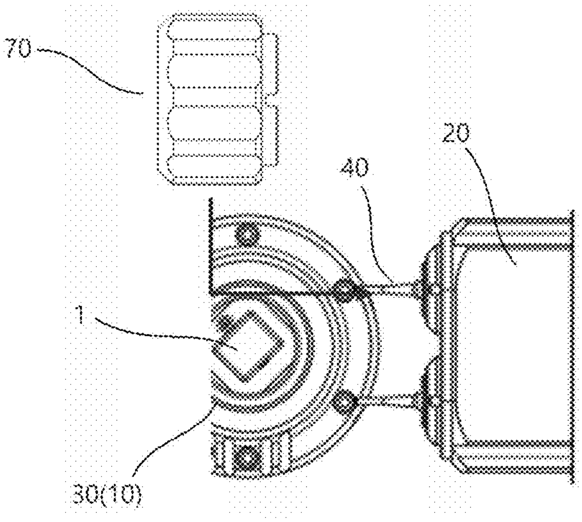
FIG. 6 is a diagram showing a state in which a special tool is used to replace a processing tool in a dental prosthesis processing device in accordance with the present disclosure.

FIG. 6 is a diagram showing a state in which a special tool is used to replace a processing tool in a dental prosthesis processing device in accordance with the present disclosure. As shown in FIG. 6, in one embodiment of the present disclosure, a special tool for disassembling the processing tool 40 from the spindle 20, for example, a socket wrench 70 must be used in order to replace the processing tool 40. The socket wrench 70 must enter in the axial direction of the processing tool 40 and be fitted into the lower part of the processing tool 40. In the present disclosure, the processing tool replacement obstruction part 30 obstructs the socket wrench 70 from entering in the axial direction of the processing tool 40, thereby serving to prevent the processing tool 40 from being replaced.

According to the present disclosure, unnecessary replacement of processing tools can be prevented as individual replacement of processing tools is possible by notifying the replacement time for each processing tool rather than all of the multiple processing tools.

According to the present disclosure, it is possible to prevent the user from arbitrarily replacing the processing tools, and the processing tools can be replaced according to the processing tool service life management by the controller 50.

According to the present disclosure, it is possible to prevent the user from replacing processing tools by mistake, and the hands of the user, tools, or the like from hitting the workpiece fixing part 10 during the process in which the user is replacing the processing tool.

Although the present disclosure has been described with reference to the accompanying drawings and example embodiments in the above, the present disclosure is not limited to what is shown in the drawings and the embodiments described above. In the following claims, reference numerals are indicated to aid understanding, but the scope of rights of the following claims should not be limited to what is shown by the reference numerals and in the drawings and should be construed comprehensively to encompass all modifications, and equivalent constructions and functions of the illustrative embodiments.

What is claimed is:

1. A dental prosthesis processing device comprising:

one or more processing tools for processing a workpiece into a prosthesis of a predetermined shape;

a spindle on which the processing tools are replaceably mounted and that is spatially movable in position;

a processing tool replacement obstruction part located in close proximity to the processing tools and/or the spindle and configured to obstruct the processing tools from being replaced; and a controller configured to determine, while the one or more processing tools are not processing the workpiece, whether to replace the processing tools, wherein, in response to determining that replacement of the processing tools is not necessary, the controller brings the processing tools and/or the spindle and the processing tool replacement obstruction part close to each other, thereby preventing the processing tools from being replaced, and wherein, in response to determining that the replacement of the processing tools is necessary, the controller moves the processing tools and/or the spindle and the processing tool replacement obstruction part away from each other, thereby allowing a user to replace the processing tools.

2. The dental prosthesis processing device of claim 1, wherein the processing tools are burs for grinding the workpiece.

3. The dental prosthesis processing device of claim 1, wherein whether to replace the processing tools is determined according to one or more selected from a group consisting of the number of uses of the processing tools, types of the processing tools, and a material of the workpiece processed by the processing tools.

4. The dental prosthesis processing device of claim 1, wherein a workpiece fixing part on which the workpiece is mounted is used as the processing tool replacement obstruction part.

5. A method of managing processing tools of a dental prosthesis processing device comprising one or more processing tools for processing a workpiece into a prosthesis of a predetermined shape; a spindle on which the processing tools are replaceably mounted and that is spatially movable in position; a processing tool replacement obstruction part located in close proximity to the processing tools and/or the spindle and configured to obstruct the processing tools from being replaced; and a controller configured to determine whether to replace the processing tools, the method comprising:

determining by the controller, while the one or more processing tools are not processing the workpiece, whether to replace the processing tools;

in response to determining that replacement of the processing tools is not necessary, preventing the processing tools from being replaced by bringing the processing tools and/or the spindle and the processing tool replacement obstruction part close to each other by the controller, and in response to determining that the replacement of the processing tools is necessary, allowing a user to replace the processing tools by moving the processing tools and/or the spindle and the processing tool replacement obstruction part away from each other by the controller.

6. The method of managing processing tools of a dental prosthesis processing device of claim 5, wherein the processing tool replacement obstruction part is located in close proximity to a front or side of the processing tools and/or the spindle and obstructs the processing tools from being removed from the spindle by blocking a path along which the processing tools are separated from the spindle or obstructing an entry of a tool for separating the processing tools from the spindle.

7. The method of managing processing tools of a dental prosthesis processing device of claim 5, wherein an approach and a move-away of the processing tools and/or the spindle to and from the processing tool replacement obstruction part are performed by moving the processing tools and the spindle, moving the processing tool replacement obstruction part, or moving both the processing tools and the spindle and the processing tool replacement obstruction part.

* * * * *